Oct. 13, 1925.

W. W. DODGE, JR 1,556,767

WAFFLE IRON

Filed Nov. 24, 1923    2 Sheets-Sheet 1

Inventor
William W. Dodge, Jr.
By Dodge & Dodge
Attorneys

Oct. 13, 1925.
W. W. DODGE, JR
1,556,767
WAFFLE IRON
Filed Nov. 24, 1923
2 Sheets-Sheet 2
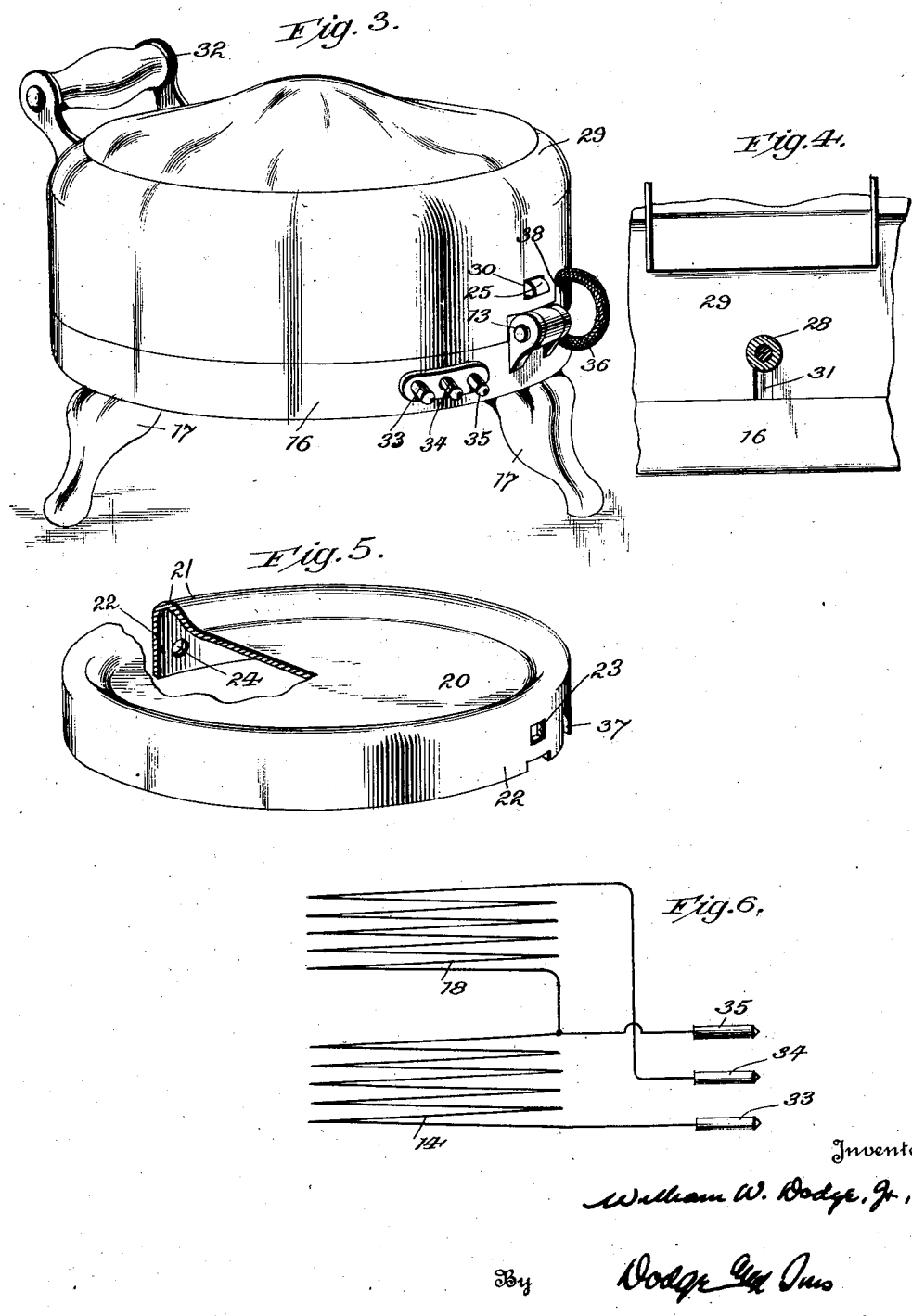

Patented Oct. 13, 1925.

1,556,767

UNITED STATES PATENT OFFICE.

WILLIAM W. DODGE, JR., OF ASHEVILLE, NORTH CAROLINA.

WAFFLE IRON.

Application filed November 24, 1923. Serial No. 676,786.

*To all whom it may concern:*

Be it known that I, WILLIAM W. DODGE, Jr., a citizen of the United States, residing at Asheville, in the county of Buncombe and State of North Carolina, have invented certain new and useful Improvements in Waffle Irons, of which the following is a specification.

This invention relates to electrically heated cooking utensils, and particularly to a convertible waffle iron and griddle.

The object of the invention is to produce a single utensil which can be used as a waffle iron or as a griddle, which costs practically no more to manufacture than existing types of waffle irons, which is convenient to use, and attractive in appearance.

I show the invention as applied to a known type of waffle iron in the accompanying drawings.

In the drawings:

Fig. 3 is a perspective view of the complete device with the cover in position looking from the rear;

Fig. 4 is a section on the line 4—4 of Fig. 1;

Fig. 5 is a perspective view of the griddle element; and

Fig. 6 is a wiring diagram.

Figure 1:
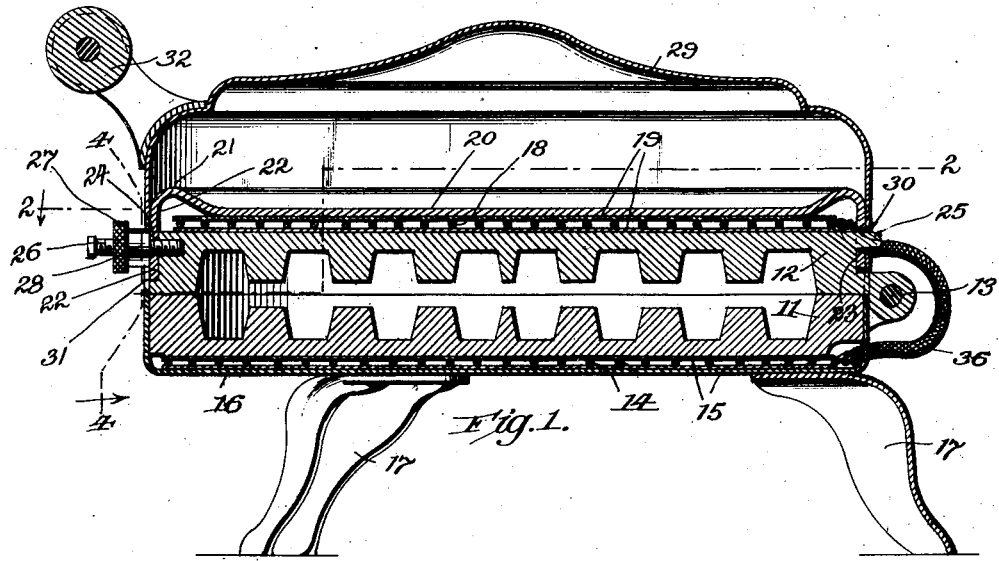
Fig. 1 is a vertical section on the line 1—1 of Fig. 2.
Figure 2:
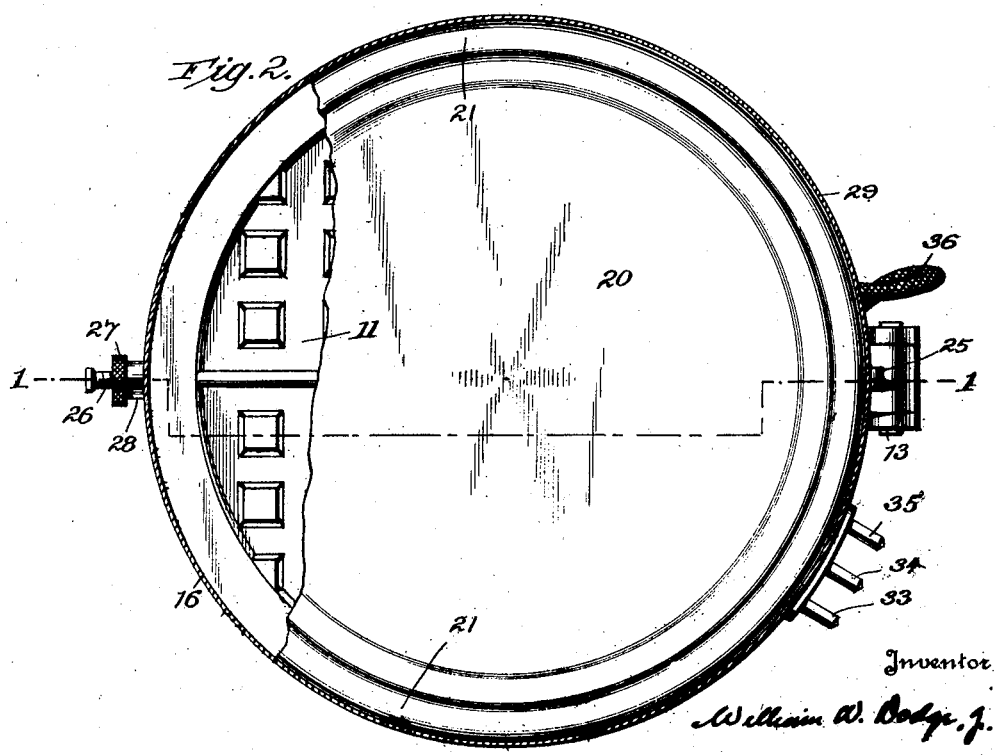
Fig. 2 is a section on the line 2—2 of Fig. 1.

The waffle iron consists as usual of two sections 11 and 12 hinged together at 13. The lower section 11 is heated by electric resistance members 14, mounted between sheets of insulation 15 such as mica. The exact form of the heating element is immaterial and the showing in the drawing is largely diagrammatic.

The lower section 11, the heating coils 14, and the insulation 15 are enclosed with a cup-shape metal case 16, provided with legs 17, upon which the whole device rests.

The upper member 12 of the waffle iron is heated by electric resistance coils 18 enclosed in the insulating sheets 19, and lying between the top or back of the element 12 and a griddle member 20, which is provided with a peripheral rim 21, and a downward extending flange 22. The griddle member 20 may be attached to the back of the waffle iron member 12 in any preferred manner, but I prefer the one illustrated. This can best be understood from Figs. 1 and 5.

The flange 22 of the griddle member 20 is formed with two holes 23 and 24 at approximately diametrically opposite points. The aperture 23 is engaged with a lug 25 cast integrally with the member 12 of the waffle iron near the rear thereof. The griddle member 20 is then swung down into position with its flange surrounding the periphery of the member 12, and is fixed in position by means of a threaded stud 26, which passes through the hole 24 and screws in the member 12. The end of the stud 26 is slightly enlarged, as shown, to retain a nut 27 having a sleeve-like body 28.

The griddle member 20, when not in use, is concealed by an ornamental cover 29 which has, at its rear, a hole 30 which engages the lug 25, and has at its front a keyhole slot 31 (see Fig. 4). This slot is so dimensioned that the cover 29, after being engaged with the lug 25, may be swung down to position, the stud 26 entering the slot 21. The nut 27 is then screwed up and its sleeve-like portion 28 enters the circular upper end of the keyhole slot 31 (see Fig. 1), thus positively locking the cover 29 in place.

The cover 29 is provided with a handle 32 and may, if desired, carry heat insulation as will be obvious. The air space under the cover 29 will ordinarily be found to offer sufficient heat insulation.

It is desirable to cut out the lower heating unit 14 when the device is being used as a griddle, as much of the heat generated in the unit 14 would be wasted, and as there would be the possibility of damage through overheating of the coil. Any arrangement for cutting out the lower heating units may be adopted but I prefer the one shown. Connection is made to the lower section of the waffle iron through suitable ones of three contacts 33, 34, and 35. These are connected up to the coils 14 and 18 as indicated in diagram in Fig. 6. This permits the coils 14 and 18 to be connected up in series or in parallel to give two different degrees of heat when these two coils are heated simultaneously, and also permits the coil 18 to be heated alone.

Since the coils 14 and 18 are in different sections of the waffle iron, the connections between the coils are made by means of a flexible cable 36, which is adjacent the hinge 13. The presence of this cable requires the notch 37 to be formed in the flange 22 of griddle 20 and a similar notch 38 to be formed in the ornamental cover 29.

The griddle member 20, as well as the waffle iron members 11 and 12, is preferably composed of aluminum to obviate the use of grease. The cover members 16 and 29 can be polished or ornamented in any suitable manner. To use the device as a waffle iron, the cover 29 is left in position and both heating elements 14 and 18 are used. To use the device as a griddle, the nut 27 is unscrewed and the cover 29 is removed to expose the griddle 20. Under these conditions, the cable lead to the utensil is connected to the terminals 34 and 35, so as to heat only the upper heating coil 18. In this way current is conserved.

The cover 29 may be used in combination with the griddle 20 and heat element 18 to form an oven.

What is claimed is:

1. The combination with a waffle iron composed of coacting sections, each provided with electrical heating means, of a griddle permanently mounted on the back of one section in close heat-conducting relation with said heating means.

2. A convertible griddle and waffle iron element, comprising in combination a member having one face formed to serve as a griddle and the other face formed to serve as one element of a waffle iron; and electrical heating means mounted within said member and arranged to heat both faces simultaneously.

3. The combination with a waffle iron composed of coacting sections and provided with electrical heating means for each section, of a griddle mounted on the back of the upper section in position to be heated by the heating means for that section; and a cover, serving when in place to conceal said griddle, releasably mounted on said upper section.

4. The combination with a waffle iron composed of coacting sections each provided with electrical heating means, of a griddle mounted on the back of one section in position to be heated by said heating means; and connections for directing current alternatively at the will of the operator to the heating means of both sections or to the heating means of the griddle-bearing section alone.

5. The combination with a waffle iron composed of coacting sections, each provided with electrical heating means, of a griddle mounted in the back of the upper section in position to be heated by the heating means of that section; a cover, serving when in place to conceal said griddle, releasably mounted on said upper section; and connections for directing current alternatively, at the will of the operator to the heating means of both sections or to the heating means of the griddle bearing section alone.

In testimony whereof I have signed my name to this specification.

WILLIAM W. DODGE, Jr.